(12) United States Patent
Russell et al.

(10) Patent No.: US 9,386,542 B2
(45) Date of Patent: Jul. 5, 2016

(54) METHOD AND APPARATUS FOR ESTIMATING TRANSMIT POWER OF A WIRELESS DEVICE

(71) Applicant: Google Technology Holdings LLC, Mountain View, CA (US)

(72) Inventors: Michael E Russell, Lake Zurich, IL (US); Amitkumar Balar, Mundelein, IL (US); Amit Jain, Mundelein, IL (US)

(73) Assignee: Google Technology Holdings, LLC, Mountain View, CA (US)

( * ) Notice: Subject to any disclaimer, the term of this patent is extended or adjusted under 35 U.S.C. 154(b) by 81 days.

(21) Appl. No.: 14/031,739

(22) Filed: Sep. 19, 2013

(65) Prior Publication Data

US 2015/0080047 A1    Mar. 19, 2015

(51) Int. Cl.
| | |
|---|---|
| *H04B 7/00* | (2006.01) |
| *H04W 52/24* | (2009.01) |
| *H04W 52/22* | (2009.01) |
| *H04W 52/10* | (2009.01) |
| *H04W 52/38* | (2009.01) |
| *H04W 52/50* | (2009.01) |
| *H04B 17/10* | (2015.01) |

(52) U.S. Cl.
CPC .......... *H04W 52/247* (2013.01); *H04W 52/226* (2013.01); *H04B 17/102* (2015.01); *H04W 52/10* (2013.01); *H04W 52/383* (2013.01); *H04W 52/50* (2013.01); *Y02B 60/50* (2013.01)

(58) Field of Classification Search
CPC . H04W 52/40; H04W 52/146; H04W 52/367; H04W 52/143; H04W 52/24; H04W 52/325; H04W 52/242; H04W 52/267; H04W 52/54; H04W 24/00; H04W 52/08; H04W 52/50; H04W 52/10; H04W 52/12; H04W 52/244; H04W 52/16; H04W 52/265

See application file for complete search history.

(56) References Cited

U.S. PATENT DOCUMENTS

| | | | |
|---|---|---|---|
| 4,612,669 | A | 9/1986 | Nossen |
| 4,631,543 | A | 12/1986 | Brodeur |
| 5,267,234 | A | 11/1993 | Harrison |
| 5,459,440 | A | 10/1995 | Claridge et al. |

(Continued)

FOREIGN PATENT DOCUMENTS

| | | |
|---|---|---|
| CN | 1762137 | 4/2006 |
| CN | 1859656 | 11/2006 |

(Continued)

OTHER PUBLICATIONS

European Patent Office, International Search Report and the Written Opinion in International Patent Application PCT/US2014/056642 (Dec. 9, 2014).

(Continued)

*Primary Examiner* — Golam Sorowar
(74) *Attorney, Agent, or Firm* — Wolfe-SBMC

(57) ABSTRACT

The present disclosure sets forth a method for tracking path loss in which a monitoring device issues a series of power step commands and transmit power requests to a reporting device, receives transmit power data in response to the transmit power requests, and creates a data structure (e.g., a table) that maps the number of steps (e.g., number of steps increased or decreased) of the power step commands with the reported transmit powers. This process is performed during the initial connection between the monitoring device and the reporting device.

20 Claims, 4 Drawing Sheets

(56) References Cited

U.S. PATENT DOCUMENTS

| | | |
|---|---|---|
| 5,564,086 A | 10/1996 | Cygan et al. |
| 5,634,200 A | 5/1997 | Kitakubo et al. |
| 5,699,319 A | 12/1997 | Skrivervik |
| 5,757,326 A | 5/1998 | Koyama et al. |
| 5,804,944 A | 9/1998 | Alberkrack et al. |
| 5,862,458 A | 1/1999 | Ishii |
| 6,144,186 A | 11/2000 | Thadiwe et al. |
| 6,339,758 B1 | 1/2002 | Kanazawa et al. |
| 6,362,690 B1 | 3/2002 | Tichauer |
| 6,373,439 B1 | 4/2002 | Zurcher et al. |
| 6,400,702 B1 | 6/2002 | Meier |
| 6,560,444 B1 | 5/2003 | Imberg |
| 6,594,508 B1 | 7/2003 | Ketonen |
| 6,674,291 B1 | 1/2004 | Barber et al. |
| 6,879,942 B1 | 4/2005 | Nagase et al. |
| 6,927,555 B2 | 8/2005 | Johnson |
| 6,937,980 B2 | 8/2005 | Krasny et al. |
| 7,142,884 B2 | 11/2006 | Hagn |
| 7,199,754 B2 | 4/2007 | Krumm et al. |
| 7,202,815 B2 | 4/2007 | Swope et al. |
| 7,260,366 B2 | 8/2007 | Lee et al. |
| 7,359,504 B1 | 4/2008 | Reuss et al. |
| 7,400,907 B2 | 7/2008 | Jin et al. |
| 7,433,661 B2 | 10/2008 | Kogiantis et al. |
| 7,436,896 B2 | 10/2008 | Hottinen et al. |
| 7,440,731 B2 | 10/2008 | Staudinger et al. |
| 7,471,963 B2 | 12/2008 | Kim et al. |
| 7,486,931 B2 | 2/2009 | Cho et al. |
| 7,504,833 B1 | 3/2009 | Sequine |
| 7,599,420 B2 | 10/2009 | Forenza et al. |
| D606,958 S | 12/2009 | Knoppert et al. |
| 7,639,660 B2 | 12/2009 | Kim et al. |
| 7,649,831 B2 | 1/2010 | Van Rensburg et al. |
| 7,664,200 B2 | 2/2010 | Ariyavisitakul et al. |
| 7,746,943 B2 | 6/2010 | Yamaura |
| 7,760,681 B1 * | 7/2010 | Chhabra ............... 370/328 |
| 7,773,535 B2 | 8/2010 | Vook et al. |
| 7,773,685 B2 | 8/2010 | Tirkkonen et al. |
| 7,822,140 B2 | 10/2010 | Catreux et al. |
| 7,835,711 B2 | 11/2010 | McFarland |
| 7,839,201 B2 | 11/2010 | Jacobson |
| 7,885,211 B2 | 2/2011 | Shen et al. |
| 7,936,237 B2 | 5/2011 | Park et al. |
| 7,940,740 B2 | 5/2011 | Krishnamurthy et al. |
| 7,942,936 B2 | 5/2011 | Golden |
| 7,945,229 B2 | 5/2011 | Wilson et al. |
| 8,014,455 B2 | 9/2011 | Kim et al. |
| 8,072,285 B2 | 12/2011 | Spears et al. |
| 8,094,011 B2 | 1/2012 | Faris et al. |
| 8,098,120 B2 | 1/2012 | Steeneken et al. |
| 8,155,683 B2 | 4/2012 | Buckley et al. |
| 8,204,446 B2 | 6/2012 | Scheer et al. |
| 8,219,336 B2 | 7/2012 | Hoebel et al. |
| 8,219,337 B2 | 7/2012 | Hoebel et al. |
| 8,232,685 B2 | 7/2012 | Perper et al. |
| 8,233,851 B2 | 7/2012 | Jeon et al. |
| 8,259,431 B2 | 9/2012 | Katta |
| 8,275,327 B2 | 9/2012 | Yi et al. |
| 8,280,323 B2 | 10/2012 | Thompson |
| 8,284,849 B2 | 10/2012 | Lee et al. |
| 8,302,183 B2 | 10/2012 | Sood |
| 8,319,393 B2 | 11/2012 | DeReus |
| 8,373,596 B1 | 2/2013 | Kimball et al. |
| 8,374,633 B2 | 2/2013 | Frank et al. |
| 8,384,695 B2 | 2/2013 | Lee et al. |
| 8,428,022 B2 | 4/2013 | Frank et al. |
| 8,460,961 B2 | 6/2013 | Guo et al. |
| 8,483,707 B2 | 7/2013 | Krishnamurthy et al. |
| 8,509,338 B2 | 8/2013 | Sayana et al. |
| 8,542,776 B2 | 9/2013 | Kim et al. |
| 8,588,426 B2 | 11/2013 | Xin et al. |
| 8,594,584 B2 | 11/2013 | Greene et al. |
| 8,606,200 B2 | 12/2013 | Ripley et al. |
| 8,611,829 B2 | 12/2013 | Alberth et al. |
| 8,620,348 B2 | 12/2013 | Shrivastava et al. |
| 8,626,083 B2 | 1/2014 | Greene et al. |
| 8,712,340 B2 | 4/2014 | Hoirup et al. |
| 8,712,355 B2 | 4/2014 | Black et al. |
| 8,731,496 B2 | 5/2014 | Drogi et al. |
| 8,761,296 B2 | 6/2014 | Zhang et al. |
| 8,767,722 B2 | 7/2014 | Kamble et al. |
| 8,989,747 B2 | 3/2015 | Padden et al. |
| 9,002,354 B2 | 4/2015 | Krishnamurthy et al. |
| 9,031,523 B2 | 5/2015 | Anderson |
| 9,197,255 B2 | 11/2015 | Pourkhaatoun et al. |
| 9,203,489 B2 | 12/2015 | Sayana et al. |
| 9,215,659 B2 | 12/2015 | Asrani et al. |
| 9,241,050 B1 | 1/2016 | Asrani et al. |
| 9,298,303 B2 | 3/2016 | Wagner et al. |
| 9,301,177 B2 | 3/2016 | Ballantyne et al. |
| 9,326,320 B2 | 4/2016 | Hong et al. |
| 9,344,837 B2 | 5/2016 | Russell et al. |
| 2001/0034238 A1 | 10/2001 | Voyer |
| 2002/0037742 A1 | 3/2002 | Enderlein et al. |
| 2002/0057751 A1 | 5/2002 | Jagger et al. |
| 2002/0090974 A1 | 7/2002 | Hagn |
| 2002/0138254 A1 | 9/2002 | Isaka et al. |
| 2002/0149351 A1 | 10/2002 | Kanekawa et al. |
| 2002/0193130 A1 | 12/2002 | Yang et al. |
| 2003/0143961 A1 | 7/2003 | Humphreys et al. |
| 2003/0161485 A1 | 8/2003 | Smith |
| 2003/0222819 A1 | 12/2003 | Karr et al. |
| 2004/0051583 A1 | 3/2004 | Hellberg |
| 2004/0052314 A1 | 3/2004 | Copeland |
| 2004/0057530 A1 | 3/2004 | Tarokh et al. |
| 2004/0063439 A1 | 4/2004 | Glazko et al. |
| 2004/0082356 A1 | 4/2004 | Walton et al. |
| 2004/0106428 A1 | 6/2004 | Shoji |
| 2004/0148333 A1 | 7/2004 | Manion et al. |
| 2004/0176125 A1 | 9/2004 | Lee |
| 2004/0178912 A1 | 9/2004 | Smith et al. |
| 2004/0192398 A1 | 9/2004 | Zhu |
| 2004/0198392 A1 | 10/2004 | Harvey et al. |
| 2004/0235433 A1 | 11/2004 | Hugl et al. |
| 2004/0246048 A1 | 12/2004 | Leyonhjelm et al. |
| 2005/0037733 A1 | 2/2005 | Coleman et al. |
| 2005/0041018 A1 | 2/2005 | Philipp |
| 2005/0075123 A1 | 4/2005 | Jin et al. |
| 2005/0124393 A1 | 6/2005 | Nuovo et al. |
| 2005/0134456 A1 | 6/2005 | Niu et al. |
| 2005/0135324 A1 | 6/2005 | Kim et al. |
| 2005/0136845 A1 | 6/2005 | Masuoka et al. |
| 2005/0208952 A1 | 9/2005 | Dietrich et al. |
| 2005/0227640 A1 | 10/2005 | Haque et al. |
| 2005/0250532 A1 | 11/2005 | Hwang et al. |
| 2006/0019677 A1 | 1/2006 | Teague et al. |
| 2006/0052131 A1 | 3/2006 | Ichihara |
| 2006/0067277 A1 | 3/2006 | Thomas et al. |
| 2006/0077952 A1 | 4/2006 | Kubsch et al. |
| 2006/0099940 A1 | 5/2006 | Pfleging et al. |
| 2006/0103635 A1 | 5/2006 | Park |
| 2006/0181453 A1 | 8/2006 | King et al. |
| 2006/0194593 A1 | 8/2006 | Drabeck et al. |
| 2006/0207806 A1 | 9/2006 | Philipp |
| 2006/0209754 A1 | 9/2006 | Ji et al. |
| 2006/0215618 A1 | 9/2006 | Soliman et al. |
| 2006/0240827 A1 | 10/2006 | Dunn |
| 2006/0245601 A1 | 11/2006 | Michaud et al. |
| 2006/0256887 A1 | 11/2006 | Kwon et al. |
| 2006/0280261 A1 | 12/2006 | Prikhodko et al. |
| 2006/0291393 A1 | 12/2006 | Teague et al. |
| 2006/0292990 A1 | 12/2006 | Karabinis et al. |
| 2007/0004344 A1 | 1/2007 | DeGroot et al. |
| 2007/0008108 A1 | 1/2007 | Schurig et al. |
| 2007/0026838 A1 | 2/2007 | Staudinger et al. |
| 2007/0042714 A1 | 2/2007 | Ayed |
| 2007/0049280 A1 | 3/2007 | Sambhwani et al. |
| 2007/0069735 A1 | 3/2007 | Graf et al. |
| 2007/0091004 A1 | 4/2007 | Puuri |
| 2007/0093281 A1 | 4/2007 | Park et al. |
| 2007/0133462 A1 | 6/2007 | Guey |
| 2007/0153743 A1 | 7/2007 | Mukkavilli et al. |
| 2007/0197180 A1 | 8/2007 | McKinzie et al. |
| 2007/0200766 A1 | 8/2007 | McKinzie et al. |

(56) References Cited

U.S. PATENT DOCUMENTS

| | | |
|---|---|---|
| 2007/0211657 A1 | 9/2007 | McBeath et al. |
| 2007/0211813 A1 | 9/2007 | Talwar et al. |
| 2007/0222629 A1 | 9/2007 | Yoneyama |
| 2007/0223422 A1 | 9/2007 | Kim et al. |
| 2007/0232370 A1 | 10/2007 | Kim |
| 2007/0238425 A1 | 10/2007 | McFarland |
| 2007/0238496 A1 | 10/2007 | Chung et al. |
| 2007/0243894 A1* | 10/2007 | Das et al. ................ 455/522 |
| 2007/0255558 A1 | 11/2007 | Yasunaga et al. |
| 2007/0280160 A1 | 12/2007 | Kim et al. |
| 2007/0285326 A1 | 12/2007 | McKinzie |
| 2008/0001915 A1 | 1/2008 | Pihlaja et al. |
| 2008/0002735 A1 | 1/2008 | Poirier et al. |
| 2008/0014960 A1 | 1/2008 | Chou |
| 2008/0026710 A1 | 1/2008 | Buckley |
| 2008/0080449 A1 | 4/2008 | Huang et al. |
| 2008/0089312 A1 | 4/2008 | Malladi |
| 2008/0095109 A1 | 4/2008 | Malladi et al. |
| 2008/0108310 A1 | 5/2008 | Tong et al. |
| 2008/0111714 A1 | 5/2008 | Kremin |
| 2008/0117886 A1 | 5/2008 | Kim |
| 2008/0130626 A1 | 6/2008 | Ventola et al. |
| 2008/0132247 A1 | 6/2008 | Anderson |
| 2008/0133462 A1 | 6/2008 | Aylward et al. |
| 2008/0157893 A1 | 7/2008 | Krah |
| 2008/0159239 A1 | 7/2008 | Odlyzko et al. |
| 2008/0165876 A1 | 7/2008 | Suh et al. |
| 2008/0167040 A1 | 7/2008 | Khandekar et al. |
| 2008/0167073 A1 | 7/2008 | Hobson et al. |
| 2008/0170602 A1 | 7/2008 | Guey |
| 2008/0170608 A1 | 7/2008 | Guey |
| 2008/0186105 A1 | 8/2008 | Scuderi et al. |
| 2008/0192683 A1 | 8/2008 | Han et al. |
| 2008/0212520 A1 | 9/2008 | Chen et al. |
| 2008/0225693 A1 | 9/2008 | Zhang et al. |
| 2008/0227414 A1 | 9/2008 | Karmi et al. |
| 2008/0227481 A1 | 9/2008 | Naguib et al. |
| 2008/0232395 A1 | 9/2008 | Buckley et al. |
| 2008/0267310 A1 | 10/2008 | Khan et al. |
| 2008/0274753 A1 | 11/2008 | Attar et al. |
| 2008/0298482 A1 | 12/2008 | Rensburg et al. |
| 2008/0307427 A1 | 12/2008 | Pi et al. |
| 2008/0309633 A1 | 12/2008 | Hotelling et al. |
| 2008/0313146 A1 | 12/2008 | Wong et al. |
| 2008/0317259 A1 | 12/2008 | Zhang et al. |
| 2009/0041151 A1 | 2/2009 | Khan et al. |
| 2009/0055170 A1 | 2/2009 | Nagahama |
| 2009/0061790 A1 | 3/2009 | Rofougaran |
| 2009/0061887 A1 | 3/2009 | Hart et al. |
| 2009/0067382 A1 | 3/2009 | Li et al. |
| 2009/0091551 A1 | 4/2009 | Hotelling et al. |
| 2009/0102294 A1 | 4/2009 | Hodges et al. |
| 2009/0121963 A1 | 5/2009 | Greene |
| 2009/0122758 A1 | 5/2009 | Smith et al. |
| 2009/0122884 A1 | 5/2009 | Vook et al. |
| 2009/0228598 A1 | 9/2009 | Stamoulis et al. |
| 2009/0238131 A1 | 9/2009 | Montojo et al. |
| 2009/0243631 A1 | 10/2009 | Kuang |
| 2009/0252077 A1 | 10/2009 | Khandekar et al. |
| 2009/0256644 A1 | 10/2009 | Knudsen |
| 2009/0258614 A1 | 10/2009 | Walker |
| 2009/0262699 A1 | 10/2009 | Wdngerter et al. |
| 2009/0264078 A1 | 10/2009 | Yun et al. |
| 2009/0268675 A1 | 10/2009 | Choi |
| 2009/0270103 A1 | 10/2009 | Pani et al. |
| 2009/0285321 A1 | 11/2009 | Schulz et al. |
| 2009/0290544 A1 | 11/2009 | Yano et al. |
| 2009/0295226 A1 | 12/2009 | Hodges et al. |
| 2009/0298433 A1 | 12/2009 | Sorrells et al. |
| 2009/0323608 A1 | 12/2009 | Adachi et al. |
| 2010/0002657 A1 | 1/2010 | Teo et al. |
| 2010/0023898 A1 | 1/2010 | Nomura et al. |
| 2010/0034312 A1 | 2/2010 | Muharemovic et al. |
| 2010/0035627 A1 | 2/2010 | Hou et al. |
| 2010/0046460 A1 | 2/2010 | Kwak et al. |
| 2010/0046650 A1 | 2/2010 | Jongren et al. |
| 2010/0056166 A1 | 3/2010 | Tenny |
| 2010/0085010 A1 | 4/2010 | Suzuki et al. |
| 2010/0103949 A1 | 4/2010 | Jung et al. |
| 2010/0106459 A1 | 4/2010 | Bakalov |
| 2010/0109796 A1 | 5/2010 | Park et al. |
| 2010/0118706 A1 | 5/2010 | Parkvall et al. |
| 2010/0118839 A1 | 5/2010 | Malladi et al. |
| 2010/0156728 A1 | 6/2010 | Alvey et al. |
| 2010/0157858 A1 | 6/2010 | Lee et al. |
| 2010/0157924 A1 | 6/2010 | Prasad et al. |
| 2010/0159833 A1 | 6/2010 | Lewis et al. |
| 2010/0161658 A1 | 6/2010 | Hamynen et al. |
| 2010/0165882 A1 | 7/2010 | Palanki et al. |
| 2010/0167743 A1 | 7/2010 | Palanki et al. |
| 2010/0172310 A1 | 7/2010 | Cheng et al. |
| 2010/0172311 A1 | 7/2010 | Agrawal et al. |
| 2010/0182903 A1 | 7/2010 | Palanki et al. |
| 2010/0189191 A1 | 7/2010 | Taoka et al. |
| 2010/0195566 A1 | 8/2010 | Krishnamurthy et al. |
| 2010/0208838 A1 | 8/2010 | Lee et al. |
| 2010/0217590 A1 | 8/2010 | Nemer et al. |
| 2010/0220801 A1 | 9/2010 | Lee et al. |
| 2010/0260154 A1 | 10/2010 | Frank et al. |
| 2010/0271330 A1 | 10/2010 | Philipp |
| 2010/0272094 A1 | 10/2010 | Byard et al. |
| 2010/0311437 A1 | 12/2010 | Palanki et al. |
| 2010/0317343 A1 | 12/2010 | Krishnamurthy |
| 2010/0322176 A1 | 12/2010 | Chen et al. |
| 2010/0323718 A1 | 12/2010 | Jen |
| 2011/0039583 A1 | 2/2011 | Frank et al. |
| 2011/0051834 A1 | 3/2011 | Lee et al. |
| 2011/0080969 A1 | 4/2011 | Jongren et al. |
| 2011/0083066 A1 | 4/2011 | Chung et al. |
| 2011/0085588 A1 | 4/2011 | Zhuang |
| 2011/0085610 A1 | 4/2011 | Zhuang et al. |
| 2011/0096739 A1 | 4/2011 | Heidari et al. |
| 2011/0103498 A1 | 5/2011 | Chen et al. |
| 2011/0105023 A1 | 5/2011 | Scheer |
| 2011/0116423 A1 | 5/2011 | Rousu et al. |
| 2011/0116436 A1 | 5/2011 | Bachu et al. |
| 2011/0117925 A1 | 5/2011 | Sampath et al. |
| 2011/0119005 A1 | 5/2011 | Majima et al. |
| 2011/0121836 A1 | 5/2011 | Kim et al. |
| 2011/0143770 A1 | 6/2011 | Charbit et al. |
| 2011/0143773 A1 | 6/2011 | Kangas et al. |
| 2011/0148625 A1 | 6/2011 | Velusamy |
| 2011/0148700 A1 | 6/2011 | Lasagabaster et al. |
| 2011/0149868 A1 | 6/2011 | Krishnamurthy et al. |
| 2011/0149903 A1 | 6/2011 | Krishnamurthy et al. |
| 2011/0157067 A1 | 6/2011 | Wagner et al. |
| 2011/0158200 A1 | 6/2011 | Bachu et al. |
| 2011/0176252 A1 | 7/2011 | DeReus |
| 2011/0189964 A1 | 8/2011 | Jeon et al. |
| 2011/0190016 A1 | 8/2011 | Hamabe et al. |
| 2011/0216840 A1 | 9/2011 | Lee et al. |
| 2011/0244884 A1 | 10/2011 | Kangas et al. |
| 2011/0249637 A1 | 10/2011 | Hammarwall et al. |
| 2011/0250852 A1 | 10/2011 | Greene |
| 2011/0268101 A1 | 11/2011 | Wang |
| 2011/0274188 A1 | 11/2011 | Sayana et al. |
| 2011/0281532 A1 | 11/2011 | Shin et al. |
| 2011/0285603 A1 | 11/2011 | Skarp |
| 2011/0286349 A1 | 11/2011 | Tee et al. |
| 2011/0292844 A1 | 12/2011 | Kwun et al. |
| 2011/0319027 A1 | 12/2011 | Sayana |
| 2012/0002609 A1 | 1/2012 | Larsson et al. |
| 2012/0008510 A1 | 1/2012 | Cai et al. |
| 2012/0021769 A1 | 1/2012 | Lindoff et al. |
| 2012/0032646 A1 | 2/2012 | Lee |
| 2012/0039251 A1 | 2/2012 | Sayana |
| 2012/0050122 A1 | 3/2012 | Wu et al. |
| 2012/0052903 A1* | 3/2012 | Han et al. ................ 455/522 |
| 2012/0071195 A1 | 3/2012 | Chakraborty et al. |
| 2012/0076043 A1 | 3/2012 | Nishio et al. |
| 2012/0077538 A1 | 3/2012 | Yun |
| 2012/0106475 A1 | 5/2012 | Jung |
| 2012/0112851 A1 | 5/2012 | Manssen et al. |
| 2012/0120772 A1 | 5/2012 | Fujisawa |

(56) References Cited

U.S. PATENT DOCUMENTS

| | | |
|---|---|---|
| 2012/0120934 A1 | 5/2012 | Cho |
| 2012/0122478 A1 | 5/2012 | Siomina et al. |
| 2012/0158839 A1 | 6/2012 | Hassan et al. |
| 2012/0161927 A1 | 6/2012 | Pierfelice et al. |
| 2012/0162129 A1 | 6/2012 | Krah et al. |
| 2012/0170541 A1 | 7/2012 | Love et al. |
| 2012/0177089 A1 | 7/2012 | Pelletier et al. |
| 2012/0182144 A1 | 7/2012 | Richardson et al. |
| 2012/0206556 A1 | 8/2012 | Yu et al. |
| 2012/0214412 A1 | 8/2012 | Schlub et al. |
| 2012/0214421 A1 | 8/2012 | Hoirup et al. |
| 2012/0220243 A1 | 8/2012 | Mendolia |
| 2012/0295554 A1 | 11/2012 | Greene et al. |
| 2012/0295555 A1 | 11/2012 | Greene et al. |
| 2012/0302188 A1 | 11/2012 | Sahota et al. |
| 2012/0306716 A1 | 12/2012 | Satake et al. |
| 2012/0309388 A1 | 12/2012 | Moosavi et al. |
| 2012/0309413 A1 | 12/2012 | Grosman et al. |
| 2012/0316967 A1 | 12/2012 | Mgrdechian et al. |
| 2013/0030803 A1 | 1/2013 | Liao |
| 2013/0034241 A1 | 2/2013 | Pandey et al. |
| 2013/0039284 A1 | 2/2013 | Marinier et al. |
| 2013/0040578 A1 | 2/2013 | Khoshnevis et al. |
| 2013/0059600 A1 | 3/2013 | Elsom-Cook et al. |
| 2013/0078980 A1 | 3/2013 | Saito |
| 2013/0094484 A1 | 4/2013 | Kneckt et al. |
| 2013/0109314 A1 | 5/2013 | Kneckt et al. |
| 2013/0109334 A1 | 5/2013 | Kwon et al. |
| 2013/0142113 A1 | 6/2013 | Fong et al. |
| 2013/0150092 A1 | 6/2013 | Frank et al. |
| 2013/0178175 A1 | 7/2013 | Kato |
| 2013/0194154 A1 | 8/2013 | Ballarda et al. |
| 2013/0195296 A1 | 8/2013 | Merks |
| 2013/0231151 A1 | 9/2013 | Kneckt et al. |
| 2013/0286937 A1 | 10/2013 | Liu et al. |
| 2013/0307735 A1 | 11/2013 | Contreras et al. |
| 2013/0310102 A1 | 11/2013 | Chao et al. |
| 2013/0316687 A1 | 11/2013 | Subbaramoo et al. |
| 2013/0322375 A1 | 12/2013 | Chang et al. |
| 2013/0322562 A1 | 12/2013 | Zhang et al. |
| 2013/0325149 A1 | 12/2013 | Manssen et al. |
| 2014/0024321 A1 | 1/2014 | Zhu et al. |
| 2014/0044126 A1 | 2/2014 | Sabhanatarajan et al. |
| 2014/0068288 A1 | 3/2014 | Robinson et al. |
| 2014/0092830 A1 | 4/2014 | Chen et al. |
| 2014/0093091 A1 | 4/2014 | Dusan et al. |
| 2014/0185498 A1 | 7/2014 | Schwent et al. |
| 2014/0227981 A1 | 8/2014 | Pecen et al. |
| 2014/0273882 A1 | 9/2014 | Asrani et al. |
| 2014/0273886 A1 | 9/2014 | Black et al. |
| 2014/0313088 A1 | 10/2014 | Rozenblit et al. |
| 2014/0349593 A1 | 11/2014 | Danak et al. |
| 2014/0376652 A1 | 12/2014 | Sayana et al. |
| 2014/0379332 A1 | 12/2014 | Rodriguez et al. |
| 2015/0017978 A1 | 1/2015 | Hong et al. |
| 2015/0024786 A1 | 1/2015 | Asrani et al. |
| 2015/0031420 A1 | 1/2015 | Higaki et al. |
| 2015/0072632 A1 | 3/2015 | Pourkhaatoun et al. |
| 2015/0171919 A1 | 6/2015 | Ballantyne et al. |
| 2015/0181388 A1 | 6/2015 | Smith |
| 2015/0236828 A1 | 8/2015 | Park et al. |
| 2015/0245323 A1 | 8/2015 | You et al. |
| 2015/0280876 A1 | 10/2015 | You et al. |
| 2015/0312058 A1 | 10/2015 | Black et al. |
| 2015/0349410 A1 | 12/2015 | Russell et al. |
| 2015/0365065 A1 | 12/2015 | Higaki et al. |
| 2016/0014727 A1 | 1/2016 | Nimbalker |
| 2016/0036482 A1 | 2/2016 | Black et al. |
| 2016/0080053 A1 | 3/2016 | Sayana et al. |

FOREIGN PATENT DOCUMENTS

| | | |
|---|---|---|
| CN | 1984476 | 6/2007 |
| CN | 101035379 | 9/2007 |
| DE | 10053205 | 5/2002 |
| DE | 10118189 | 11/2002 |
| EP | 0695059 | 1/1996 |
| EP | 1158686 | 11/2001 |
| EP | 1298809 | 4/2003 |
| EP | 1357543 | 10/2003 |
| EP | 1511010 | 3/2005 |
| EP | 1753152 | 2/2007 |
| EP | 1443791 | 2/2009 |
| EP | 2487967 | 8/2012 |
| EP | 2255443 | 11/2012 |
| EP | 2557433 | 2/2013 |
| EP | 2568531 | 3/2013 |
| EP | 2590258 | 5/2013 |
| JP | H09247852 | 9/1997 |
| JP | 2000286924 | 10/2000 |
| KR | 20050058333 | 6/2005 |
| RU | 2005113251 | 1/2006 |
| WO | WO-9306682 | 4/1993 |
| WO | WO-9416517 | 7/1994 |
| WO | WO-9600401 | 1/1996 |
| WO | WO-9921389 | 4/1999 |
| WO | WO-9950968 | 10/1999 |
| WO | WO-0111721 | 2/2001 |
| WO | WO-03007508 | 1/2003 |
| WO | WO-03107327 | 12/2003 |
| WO | WO-2004021634 | 3/2004 |
| WO | WO-2004040800 | 5/2004 |
| WO | WO-2004084427 | 9/2004 |
| WO | WO-2004084447 | 9/2004 |
| WO | WO-2006039434 | 4/2006 |
| WO | WO-2006046192 | 5/2006 |
| WO | WO-2006130278 | 12/2006 |
| WO | WO-2007052115 | 5/2007 |
| WO | WO-2007080727 | 7/2007 |
| WO | WO-2008027705 | 3/2008 |
| WO | WO-2008033117 | 3/2008 |
| WO | WO-2008085107 | 7/2008 |
| WO | WO-2008085416 | 7/2008 |
| WO | WO-2008085720 | 7/2008 |
| WO | WO-2008112849 | 9/2008 |
| WO | WO-2008113210 | 9/2008 |
| WO | WO-2008137354 | 11/2008 |
| WO | WO-2008137607 | 11/2008 |
| WO | WO-2008156081 | 12/2008 |
| WO | WO-2009107090 | 9/2009 |
| WO | WO-2010080845 | 7/2010 |
| WO | WO-2010124244 | 10/2010 |
| WO | WO-2010138039 | 12/2010 |
| WO | WO-2012115649 | 8/2012 |
| WO | 2012149968 A1 | 11/2012 |
| WO | WO-2012177939 | 12/2012 |
| WO | WO-2013131268 | 9/2013 |

OTHER PUBLICATIONS

US 8,224,317, 8/14/2012, Knoppert, et al. (withdrawn).

"3rd Generation Partnership Project; Technical Specification Group Radio Access Network", 3GPP TR 36.814 V9.0.0 (Mar. 2010), Further Advancements for E-UTRA Physical Layer Aspects (Release 9), Mar. 2010, 104 pages.

"A feedback framework based on W2W1 for Rei. 10", 3GPP TSG RAN WG1 #61bis, R1-103664,, Jun. 2010, 19 pages.

"Addition of PRS Muting Configuration Information to LPPa", 3GPP TSG RAN3 #68, Montreal, Canada; Ericsson, R3-101526, May 2010, 7 pages.

"Advisory Action", U.S. Appl. No. 12/650,699, Jan. 30, 2013, 3 pages.

"Advisory Action", U.S. Appl. No. 12/650,699, Sep. 25, 2014, 3 pages.

"Best Companion reporting for improved single- cell MU-MIMO pairing", 3GPP TSG RAN WG1 #56; Athens, Greece; Alcatei-Lucent, R1-090926, Feb. 2009, 5 pages.

"Change Request—Clarification of the CP length of empty OFDM symbols in PRS subframes", 3GPP TSG RAN WG1 #59bis, Jeju, Vaiencia, Spain, ST-Ericsson, Motorola, Qualcomm Inc, R1-100311;, Jan. 2009, 2 pages.

(56) References Cited

OTHER PUBLICATIONS

"Change Request 36.211—Introduction of LTE Positioning", 3GPP TSG RAN WG1 #59, Jeju, South Korea; Ericsson, R1-095027, May 2010, 6 pages.
"Change Request 36.213 Clarification of POSCH and PRS in combination for LTE positioning", 3GPP TSG RAN WG1 #58bis, Miyazaki, Japan; Ericsson, et al., R1-094262;, Oct. 2009, 4 pages.
"Change Request 36.214—Introduction of LTE Positioning", 3GPP TSG RAN WG1 #59, Jeju, South Korea, Ericsson, et al., R1-094430, Nov. 2009, 4 pages.
"Companion Subset Based PMI/CQI Feedback for LTE-A MU-MIMO", 3GPP TSG RAN WG1 #60; San Francisco, USA, RIM; R1-101104, Feb. 2010, 8 pages.
"Comparison of PMI-based and SCF-based MU-MIMO", 3GPP TSG RAN1 #58; Shenzhen, China; R1-093421,, Aug. 2009, 5 pages.
"Development of two-stage feedback framework for Rel-10", 3GPP TSG RAN WG1 #60bis Meeting, R1-101859, Alcatel-Lucent Shanghai Bell, Alcatel-Lucent, Apr. 2010, 5 pages.
"Digital cellular telecommunications system (Phase 2+)", Location Services (LCS); Broadcast Network Assistance for Enhanced Observed Time Difference (E-OTD) and Global Positioning System (GPS) Positioning Methods (3GPP TS 04.35 version 8.3.0 Release 1999), 2001, 37 pages.
"Discussions on UE positioning issues", 3GPP TSG-RAN WG1 #57 R1-091911, San Francisco, USA,, May 2009, 12 pages.
"DL Codebook design for 8Tx preceding", 3GPP TSG RAN WG1 #60bis, R1-102380, LG Electronics, Beijing, China, Apr. 2010, 4 pages.
"Double codebook design principles", 3GPP TSG RAN WG1 #61bis, R1-103804, Nokia, Nokia Siemens Networks, Dresden, Germany, Jun. 2010, 9 pages.
"Evaluation of protocol architecture alternatives for positioning", 3GPP TSG-RAN WG2 #66bis R2-093855, Los Angeles, CA, USA, Jun. 2009, 4 pages.
"Ex Parte Quayle Action", U.S. Appl. No. 13/088,237, Dec. 19, 2012, 5 pages.
"Extended European Search Report", EP Application No. 12196319.3, Feb. 27, 2014, 7 pages.
"Extended European Search Report", EP Application No. 12196328.4, Feb. 26, 2014, 7 pages.
"Extensions to Rel-8 type CQI/PMI/RI feedback using double codebook structure", 3GPP TSG RAN WG1#59bis, R1-100251, Valencia, Spain,, Jan. 2010, 4 pages.
"Feedback Codebook Design and Performance Evaluation", 3GPP TSG RAN WG1 #61bis, R1-103970, LG Electronics, Jun. 2010, 6 pages.
"Feedback considerations for DL MIMO and CoMP", 3GPP TSG RAN WG1 #57bis; Los Angeles, USA; Qualcomm Europe; R1-092695, Jun. 2009, 6 pages.
"Final Office Action", U.S. Appl. No. 12/407,783, Feb. 15, 2012, 18 pages.
"Final Office Action", U.S. Appl. No. 12/573,456, Mar. 21, 2012, 12 pages.
"Final Office Action", U.S. Appl. No. 12/650,699, Jul. 16, 2014, 20 pages.
"Final Office Action", U.S. Appl. No. 12/650,699, Jul. 29, 2015, 26 pages.
"Final Office Action", U.S. Appl. No. 12/650,699, Nov. 13, 2012, 17 pages.
"Final Office Action", U.S. Appl. No. 12/756,777, Nov. 1, 2013, 12 pages.
"Final Office Action", U.S. Appl. No. 12/899,211, Oct. 24, 2013, 17 pages.
"Final Office Action", U.S. Appl. No. 13/477,609, Jul. 31, 2015, 11 pages.
"Final Office Action", U.S. Appl. No. 13/692,520, Apr. 2, 2015, 15 pages.
"Final Office Action", U.S. Appl. No. 13/721,771, Oct. 29, 2015, 8 pages.
"Final Office Action", U.S. Appl. No. 13/733,297, Jul. 22, 2015, 20 pages.
"Final Office Action", U.S. Appl. No. 13/873,557, Jul. 17, 2015, 13 pages.
"Final Office Action", U.S. Appl. No. 14/012,050, Jul. 6, 2015, 23 pages.
"Final Office Action", U.S. Appl. No. 14/052,903, Oct. 1, 2015, 10 pages.
"Final Office Action", U.S. Appl. No. 14/280,775, Dec. 9, 2015, 13 pages.
"Foreign Office Action", CN Application No. 201080025882.7, Feb. 8, 2014, 19 pages.
"Further details on DL OTDOA", 3GPP TSG RAN WG1 #56bis, Seoul, South Korea—Ericsson, R1-091312,, Mar. 2009, 6 pages.
"Further Refinements of Feedback Framework", 3GPP TSG-RAN WG1 #60bis R1-101742; Ericsson, ST-Ericsson, Apr. 2010, 8 pages.
"IEEE 802.16m System Description Document [Draft]", IEEE 802.16 Broadband Wireless Access Working Group, Nokia, Feb. 7, 2009, 171 pages.
"Implicit feedback in support of downlink MU-MIMO" Texas Instruments, 3GPP TSG RAN WG1 #58; Shenzhen, China, R1-093176, Aug. 2009, 4 pages.
"Improving the hearability of LTE Positioning Service", 3GPP TSG RAN WG1 #55bis; Alcatei-Lucent, R1-090053 Jan. 2009, 5 pages.
"Innovator in Electronics, Technical Update, Filters & Modules PRM Alignment", Module Business Unit, Apr. 2011, 95 pages.
"International Preliminary Report on Patentability", Application No. PCT/US2013/042042, Mar. 10, 2015, 8 pages.
"International Search Report and Written Opinion", Application No. PCT/US2014/060440, Feb. 5, 2015, 11 pages.
"International Search Report and Written Opinion", Application No. PCT/US2015/031328, Aug. 12, 2015, 11 pages.
"International Search Report and Written Opinion", Application No. PCT/US2014/045956, Oct. 31, 2014, 11 pages.
"International Search Report and Written Opinion", Application No. PCT/US2013/071615, Mar. 5, 2014, 13 pages.
"International Search Report and Written Opinion", Application No. PCT/US2013/040242, Oct. 4, 2013, 14 pages.
"International Search Report and Written Opinion", Application No. PCT/US2014/047233, Jan. 22, 2015, 8 pages.
"International Search Report and Written Opinion", Application No. PCT/US2013/077919, Apr. 24, 2014, 8 pages.
"International Search Report and Written Opinion", Application No. PCT/US2014/070925, May 11, 2015, 9 pages.
"International Search Report and Written Opinion", Application No. PCT/US2014/018564, Jun. 18, 2014, 11 pages.
"International Search Report and Written Opinion", Application No. PCT/US2013/072718, Jun. 18, 2014, 12 pages.
"International Search Report and Written Opinion", Application No. PCT/US2015/027872, Jul. 15, 2015, 12 pages.
"International Search Report and Written Opinion", Application No. PCT/US2010/026579, Feb. 4, 2011, 13 pages.
"International Search Report and Written Opinion", Application No. PCT/US2011/034959, Aug. 16, 2011, 13 pages.
"International Search Report and Written Opinion", Application No. PCT/US2011/045209, Oct. 28, 2011, 14 pages.
"International Search Report and Written Opinion", Application No. PCT/US2011/039214, Sep. 14, 2011, 9 pages.
"International Search Report and Written Opinion", Application No. PCT/US2010/038257, Oct. 1, 2010, 9 pages.
"International Search Report and Written Opinion", Application No. PCT/US2010/034023, Dec. 1, 2010, 9 pages.
"International Search Report", Application No. PCT/US20013/071616, Mar. 5, 2014, 2 pages.
"International Search Report", Application No. PCT/US2010/030516, Oct. 8, 2010, 5 pages.
"International Search Report", Application No. PCT/US2010/036982, Nov. 22, 2010, 4 pages.
"International Search Report", Application No. PCT/US2010/041451, Oct. 25, 2010, 3 pages.
"International Search Report", Application No. PCT/US2011/044103, Oct. 24, 2011, 3 pages.

(56) References Cited

OTHER PUBLICATIONS

"International Search Report", Application No. PCT/US2014/014375, Apr. 7, 2014, 4 pages.
"Introduction of LTE Positioning", 3GPP TSG RAN WG1 #58, Shenzhen, China, R1-093604; Draft CR 36.213, Aug. 2009, 3 pages.
"Introduction of LTE Positioning", 3GPP TSG RAN WG1 #59, Jeju, South Korea, Ericsson et al.; R1-094429,, Nov. 2009, 5 pages.
"Introduction of LTE Positioning",, 3GPP TSG RAN WG1 #58, Shenzhen, China; Draft CR 36.214; R1-093605;, Aug. 2009, 6 pages.
"Introduction of LTE Positioning",, 3GPP TSG-RAN WG1 Meeting #58, R1-093603, Shenzhen, China,, Aug. 2009, 5 pages.
"LS on 12 5. Assistance Information for OTDOA Positioning Support for LTE Rel-9", 3GPP TSG RAN WG1 Meeting #58; Shenzhen, China; R1-093729, Aug. 2009, 3 pages.
"LS on LTE measurement supporting Mobility", 3GPP TSG WG1 #48, Tdoc R1-071250; StLouis, USA, Feb. 2007, 2 pages.
"LTE Positioning Protocol (LPP)", 3GPP TS 36.355 V9.0.0 (Dec. 2009); 3rd Generation Partnership Project; Technical Specification Group Radio Access Network; Evolved Universal Terrestrial Radio Access (E-UTRA); Release 9, Dec. 2009, 102 pages.
"Market & Motivation (MRD Section3) for Interoperability Testing of Neighbor Awareness Networking", WiFi Alliance Neighbor Awareness Networking Marketing Task Group, Version 0.14, 2011, 18 pages.
"Marketing Statement of Work Neighbor Awareness Networking", Version 1.17, Neighbor Awareness Networking Task Group, May 2012, 18 pages.
"Method for Channel Quality Feedback in Wireless Communication Systems", U.S. Appl. No. 12/823,178, filed Jun. 25, 2010, 34 pages.
"Non-Final Office Action", U.S. Appl. No. 12/407,783, Sep. 9, 2013, 16 pages.
"Non-Final Office Action", U.S. Appl. No. 12/407,783, Oct. 5, 2011, 14 pages.
"Non-Final Office Action", U.S. Appl. No. 12/480,289, Jun. 9, 2011, 20 pages.
"Non-Final Office Action", U.S. Appl. No. 12/492,339, Aug. 19, 2011, 13 pages.
"Non-Final Office Action", U.S. Appl. No. 12/542,374, Feb. 24, 2014, 25 pages.
"Non-Final Office Action", U.S. Appl. No. 12/542,374, Aug. 7, 2013, 22 pages.
"Non-Final Office Action", U.S. Appl. No. 12/542,374, Aug. 31, 2012, 27 pages.
"Non-Final Office Action", U.S. Appl. No. 12/542,374, Dec. 23, 2011, 22 pages.
"Non-Final Office Action", U.S. Appl. No. 12/573,456, Nov. 18, 2011, 9 pages.
"Non-Final Office Action", U.S. Appl. No. 12/577,553, Feb. 4, 2014, 10 pages.
"Non-Final Office Action", U.S. Appl. No. 12/577,553, Aug. 12, 2013, 11 pages.
"Non-Final Office Action", U.S. Appl. No. 12/577,553, Dec. 28, 2011, 7 pages.
"Non-Final Office Action", U.S. Appl. No. 12/650,699, Mar. 30, 2015, 28 pages.
"Non-Final Office Action", U.S. Appl. No. 12/650,699, Apr. 23, 2013, 19 pages.
"Non-Final Office Action", U.S. Appl. No. 12/650,699, Jul. 19, 2012, 12 pages.
"Non-Final Office Action", U.S. Appl. No. 12/650,699, Dec. 16, 2013, 26 pages.
"Non-Final Office Action", U.S. Appl. No. 12/756,777, Apr. 19, 2013, 17 pages.
"Non-Final Office Action", U.S. Appl. No. 12/813,221, Oct. 8, 2013, 10 pages.
"Non-Final Office Action", U.S. Appl. No. 12/823,178, Aug. 23, 2012, 15 pages.
"Non-Final Office Action", U.S. Appl. No. 12/899,211, Apr. 10, 2014, 12 pages.
"Non-Final Office Action", U.S. Appl. No. 12/899,211, May 22, 2013, 17 pages.
"Non-Final Office Action", U.S. Appl. No. 12/973,467, Mar. 28, 2013, 9 pages.
"Non-Final Office Action", U.S. Appl. No. 13/477,609, Dec. 3, 2014, 7 pages.
"Non-Final Office Action", U.S. Appl. No. 13/477,609, Dec. 14, 2015, 9 pages.
"Non-Final Office Action", U.S. Appl. No. 13/692,520, Sep. 5, 2014, 15 pages.
"Non-Final Office Action", U.S. Appl. No. 13/692,520, Oct. 5, 2015, 17 pages.
"Non-Final Office Action", U.S. Appl. No. 13/721,771, May 20, 2015, 6 pages.
"Non-Final Office Action", U.S. Appl. No. 13/733,297, Mar. 13, 2015, 23 pages.
"Non-Final Office Action", U.S. Appl. No. 13/759,089, Apr. 18, 2013, 16 pages.
"Non-Final Office Action", U.S. Appl. No. 13/873,557, Mar. 11, 2015, 19 pages.
"Non-Final Office Action", U.S. Appl. No. 13/924,838, Nov. 28, 2014, 6 pages.
"Non-Final Office Action", U.S. Appl. No. 13/945,968, Apr. 28, 2015, 16 pages.
"Non-Final Office Action", U.S. Appl. No. 13/955,723, Dec. 17, 2015, 21 pages.
"Non-Final Office Action", U.S. Appl. No. 14/012,050, Feb. 10, 2015, 18 pages.
"Non-Final Office Action", U.S. Appl. No. 14/052,903, Mar. 11, 2015, 7 pages.
"Non-Final Office Action", U.S. Appl. No. 14/150,047, Jun. 29, 2015, 11 pages.
"Non-Final Office Action", U.S. Appl. No. 14/226,041, Jun. 5, 2015, 8 pages.
"Non-Final Office Action", U.S. Appl. No. 14/280,775, Jul. 16, 2015, 9 pages.
"Non-Final Office Action", U.S. Appl. No. 14/445,715, Jan. 15, 2016, 26 pages.
"Non-Final Office Action", U.S. Appl. No. 14/952,738, Jan. 11, 2016, 7 pages.
"Notice of Allowance", U.S. Appl. No. 12/365,166, Apr. 16, 2010, 7 pages.
"Notice of Allowance", U.S. Appl. No. 12/365,166, Aug. 25, 2010, 4 pages.
"Notice of Allowance", U.S. Appl. No. 12/650,699, Jan. 14, 2016, 8 pages.
"Notice of Allowance", U.S. Appl. No. 13/040,090, Mar. 8, 2012, 6 pages.
"Notice of Allowance", U.S. Appl. No. 13/088,237, Jun. 17, 2013, 8 pages.
"Notice of Allowance", U.S. Appl. No. 13/088,237, Jul. 11, 2013, 8 pages.
"Notice of Allowance", U.S. Appl. No. 13/188,419, May 22, 2013, 8 pages.
"Notice of Allowance", U.S. Appl. No. 13/873,557, Dec. 23, 2015, 10 pages.
"Notice of Allowance", U.S. Appl. No. 13/924,838, Mar. 12, 2015, 7 pages.
"Notice of Allowance", U.S. Appl. No. 13/924,838, Jul. 8, 2015, 7 pages.
"Notice of Allowance", U.S. Appl. No. 13/945,968, Sep. 16, 2015, 6 pages.
"Notice of Allowance", U.S. Appl. No. 14/012,050, Dec. 14, 2015, 12 pages.
"Notice of Allowance", U.S. Appl. No. 14/226,041, Dec. 31, 2015, 5 pages.
"Notice of Allowance", U.S. Appl. No. 14/488,709, Sep. 23, 2015, 10 pages.
"On Extensions to Rel-8 PMI Feedback", 3GPP TSG RAN WG1 #60, R1-101129, Motorola, San Francisco, USA Feb. 2010, 4 pages.
"On OTDOA in LTE", 3GPP TSG RAN WG1 #55bis, Ljubljana, Slovenia; R1-090353, Jan. 2009, 8 pages.

(56) References Cited

OTHER PUBLICATIONS

"On OTDOA method for L TE Positioning", 3GPP TSG RAN WG1 #56, Ericsson, R1-090918, Athens, Greece, Feb. 2009, 6 pages.
"On Serving Cell Muting for OTDOA Measurements", 3GPP TSG RAN1 #57, R1-092628—Los Angeles, CA, USA, Jun. 2009, 7 pages.
"Performance evaluation of adaptive codebook as enhancement of 4 Tx feedback", 3GPP TSG RAN WG1#61bis, R1-103447, Jul. 2010, 6 pages.
"PHY Layer 1 1 4. Specification Impact of Positioning Improvements", 3GPP TSG RAN WG1 #56bis, Athens, Greece; Qualcomm Europe, R1-090852,, Feb. 2009, 3 pages.
"Physical Channels and Modulation (Release 8)", 3GPP TS 36.211 V8.6.0 (Mar. 2009) 3rd Generation Partnership Project; Technical Specification Group Radio Access 28 Network; Evolved Universal Terrestrial Radio Access (E-UTRA);, Mar. 2009, 83 pages.
"Physical Channels and Modulation (Release 9)", 3GPP TS 36.211 V9.0.0 (Dec. 2009); 3rd Generation Partnership Project; Technical Specification Group Radio Access Network; Evolved Universal Terrestrial Radio Access (E-UTRA); Release 9, Dec. 2009, 85 pages.
"Physical layer procedures", 3GPP TS 36.213 V9.0.1 (Dec. 2009); 3rd Generation Partnership Project; Technical Specification Group Radio Access Network; Evolved Universal Terrestrial Radio Access (E-UTRA); Release 9, Dec. 2009, 79 pages.
"Positioning Subframe Muting for OTDOA Measurements", 3GPP TSG RAN1 #58 R1-093406, Shenzhen, P. R. China, Aug. 2009, 9 pages.
"Positioning Support for L TE", 3GPP TSG RAN WG1 #42, Athens, Greece, RP-080995, Dec. 2008, 5 pages.
"Pre-Brief Appeal Conference Decision", U.S. Appl. No. 12/650,699, Apr. 9, 2013, 2 pages.
"Rationale for mandating simulation of 4Tx Widely-Spaced Cross-Polarized Antenna Configuration for LTE-Advanced MU-MIMO", 3GPP TSG-RAN WG1 Meeting #61bis, R1-104184, Dresden, Germany, Jun. 2010, 5 pages.
"Reference Signals for Low Interference Subframes in Downlink;", 3GPP TSG RAN WG1 Meeting #56bis; Seoul, South Korea; Ericsson; R1-091314, Mar. 2009, 8 pages.
"Restriction Requirement", U.S. Appl. No. 13/721,771, Mar. 16, 2015, 5 pages.
"Signaling Support for PRS Muting in", 3GPP TSG RAN2 #70, Montreal, Canada; Ericsson, ST-Ericsson; R2-103102, May 2010, 2 pages.
"Some Results on DL-MIMO Enhancements for LTE-A", 3GPP TSG WG1 #55bis, R1-090328, Motorola; Ljubjana, Slovenia, Jan. 2009, 5 pages.
"Sounding RS Control Signaling for Closed Loop Antenna Selection", 3GPP TSG RAN #51, R1-080017—Mitsubishi Electric, Jan. 2008, 8 pages.
"Study on hearability of reference signals in LTE positioning support", 3GPP TSG RAN1 #56bisa—R1-091336, Seoul, South Korea, Mar. 2009, 8 pages.
"Supplemental Notice of Allowance", U.S. Appl. No. 14/488,709, Oct. 7, 2015, 8 pages.
"System Simulation Results for OTDOA", 3GPP TSG RAN WG4 #53, Jeju, South Korea, Ericsson, R4-094532;, Nov. 2009, 3 pages.
"Technical 1 34. Specification Group Radio Access Network; Evolved Universal Terrestrial Radio Access (E-UTRA);", 3GPP TS 36.211 v8.4.0 (Sep. 2008); 3rd Generation Partnership Project; Physical Channels and Modulation (Release 8), 2008, 78 pages.
"Technical Specification Group Radio Access Network", 3GPP TS 25.305 V8.1.0 (Dec. 2008) 3rd Generation Partnership Project; Stage 2 functional specification of User Equipment (UE) positioning in UTRAN (Release 8), 2008, 79 pages.
"Technical Specification Group Radio Access Network; Evolved Universal Terrestrial Radio Access (E-UTRA)", 3GPP TS 36.305 V0.2.0 (May 2009) 3rd generation Partnership Project; Stage 2 functional specification of User Equipment, (UE) positioning in E-UTRAN (Release 9);, 2010, 52 pages.
"Text 1 3 0. proposal on Orthonogonal PRS transmissions in mixed CP deployments using MBSFN subframes", 3GPP TSG RAN WG1 #59, Jeju, South Korea, Motorola, R1-095003;, Nov. 2009, 4 pages.
"Text proposal on measurements", 3GPP TSG RAN2 #60bis, Tdoc R2-080420; Motorola, Sevilla, Spain, Jan. 2008, 9 pages.
"Two Component Feedback Design and Codebooks", 3GPP TSG RAN1 #61, R1-103328, Motorola, Montreal, Canada, May 2010, 7 pages.
"Two-Level Codebook design for MU MIMO enhancement", 3GPP TSG RAN WG1 #60, R1-102904, Montreal, Canada, May 2010, 8 pages.
"UTRAN SFN-SFN observed lime 11 difference measurement & 3GPP TS 25.311 IE 10.3.7.106 "UE positioning OTDOA neighbor cell info assistance data D fields"", 3GPP TSG RAN WG4 (Radio) #20, New Jersey, USA; Tdoc R4-011408,, Nov. 2001, 4 pages.
"View on the feedback framework for Rei. 1 0", 3GPP TSG RAN WG1 #61, R1-103026, Samsung, Montreal, Canada, May 2010, 15 pages.
"Views on Codebook Design for Downlink 8Tx MIMO", 3GPP TSG RAN WG1 #60. R1-101219, San Francisco, USA, Feb. 2010, 9 pages.
Colin,"Restrictions on Autonomous Muting to Enable 1 58. Time Difference of Arrival Measurements", U.S. Appl. No. 61/295,678, filed Jan. 15, 2010, 26 pages.
Costas,"A Study of a Class of Detection Waveforms Having Nearly Ideal Range-Doppler Ambiguity Properties", Fellow, IEEE; Proceedings of the IEEE, vol. 72, No. 8, Aug. 1984, 14 pages.
Guo,"A Series-Shunt Symmetric Swtich Makes Transmit-Receive Antennas Reconfigurable in Multipath Channels", IEEE 3d Int'l Conf. on Digital Object Identifier, May 29, 2011, pp. 468-471.
Jafar,"On Optimality of Beamforming for Multiple Antenna Systems with Imperfect Feedback", Department of Electrical Engineering, Stanford University, CA, USA, 2004, 7 pages.
Knoppert,"Communication Device", U.S. Appl. No. 29/329,028, filed Dec. 8, 2008, 10 pages.
Knoppert,"Indicator Shelf for Portable Electronic Device", U.S. Appl. No. 12/480,289, filed Jun. 8, 2009, 15 pages.
Krishnamurthy,"Interference Control, SINR Optimization and Signaling Enhancements to Improve the Performance of OTDOA Measurements", U.S. Appl. No. 12/813,221, filed Jun. 10, 2010, 20 pages.
Krishnamurthy,"Threshold Determination in TDOA-Based Positioning System", U.S. Appl. No. 12/712,191, filed Feb. 24, 2010, 19 pages.
Li,"A Subband Feedback Controlled Generalized Sidelobe Canceller in Frequency Domain with Multi-Channel Postfilter", 2nd International Workshop on Intelligent Systems and Applications (ISA), IEEE, May 22, 2010, 4 pages.
MACCM"GaAs SP6T 2.5V High Power Switch Dual-/Tri-/Quad-Band GSM Applications", Rev. V1 data sheet, www.macomtech.com, Mar. 22, 2003, 5 pages.
Renesas,"uPG2417T6M GaAs Integrated Circuit SP6T Switch for NFC Application (R09DS0010EJ0100)", Rev. 1.00 data sheet, Dec. 24, 2010, 12 pages.
Sayana,"Method of Codebook Design and Precoder Feedback in Wireless Communication Systems", U.S. Appl. No. 61/374,241, filed Aug. 16, 2010, 40 pages.
Sayana,"Method of Precoder Information Feedback in Multi-Antenna Wireless Communication Systems", U.S. Appl. No. 61/331,818, filed May 5, 2010, 43 pages.
Tesoriero,"Improving Location Awareness in Indoor Spaces Using RFID Technology", ScienceDirect, Expert Systems with Applications, 2010, 894-898.
Valkonen,"Impedance Matching and Tuning of Non-Resonant Mobile Terminal Antennas", Aalto University Doctoral Dissertations, Mar. 15, 2013, 94 pages.
Visotsky,"Space—Time Transmit Precoding With Imperfect Feedback", IEEE Transactions on Information Theory, Vol. 47, No. 6, Sep. 2001, pp. 2632-2639.
Vodafone"PDCCH Structure for MTC Enhanced Coverage", 3GPP TSG RAN WG1 #76, R1-141030, Prague, Czech Republic, Feb. 2014, 2 pages.

(56) References Cited

OTHER PUBLICATIONS

Yun,"Distributed Self-Pruning(DSP) Algorithm for Bridges in Clustered Ad Hoc Networks", Embedded Software and Systems; Lecture Notes in Computer Science, Springer, May 14, 2007, pp. 699-707.
Zhuang,"Method for Precoding Based on Antenna Grouping", U.S. Appl. No. 12/899,211, filed Oct. 6, 2010, 26 pages.
Final Office Action, U.S. Appl. No. 14/150,047, Mar. 4, 2016, 14 pages.
Non-Final Office Action, U.S. Appl. No. 13/733,297, Feb. 2, 2016, 17 pages.
Non-Final Office Action, U.S. Appl. No. 14/280,775, Mar. 23, 2016, 11 pages.
Non-Final Office Action, U.S. Appl. No. 14/330,317, Feb. 25, 2016, 14 pages.
Notice of Allowance, U.S. Appl. No. 13/873,557, Apr. 11, 2016, 5 pages.
Notice of Allowance, U.S. Appl. No. 14/052,903, Feb. 1, 2016, 8 pages.
Notice of Allowance, U.S. Appl. No. 14/952,738, Mar. 28, 2016, 7 pages.

* cited by examiner

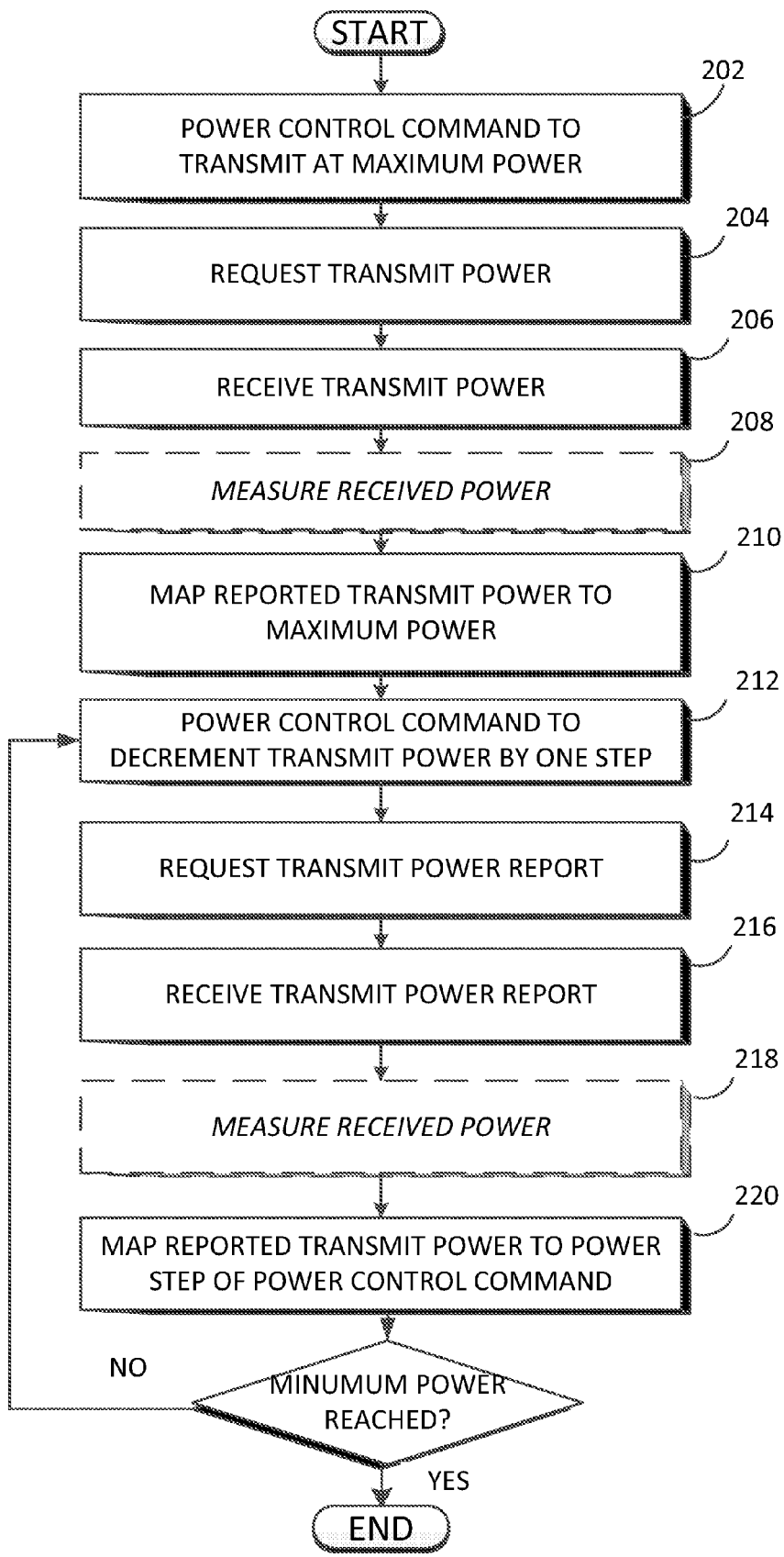

METHOD AND APPARATUS FOR ESTIMATING TRANSMIT POWER OF A WIRELESS DEVICE

TECHNICAL FIELD

The disclosure relates generally to wireless communication and, more specifically, to estimating the transmit power of wireless devices.

BACKGROUND

As smartphones have become dominant in the cellular marketplace, companies are selling increasingly sophisticated wireless accessories. These accessories, such as headphones, wristwatches, glasses, and other wearable devices, are designed to connect to smartphones or other accessories in a secure manner. The devices communicate with one another using one or more well-known methods such as Bluetooth® or one of the IEEE 802.11 standards.

During communication between the accessory and the smartphone, it is generally desirable to keep the received signal strength (as perceived by each device) within a particular power range, sometimes referred to as the Golden Receive Power Range or Golden Window. The upper and lower boundaries of this range vary, but in one implementation this range is from −60 dBm to −40 dBm. To do so, devices can issue power control commands to one another to indicate whether their transmit power should be increased or decreased.

In some architectures, such as Bluetooth®, power control is open loop in that when one device tells another device to change its transmit power, the device making the change does not provide feedback as to what its transmit power really is. Furthermore, the device making the change does not necessarily do so in equally-sized power steps, but instead makes the changes within a certain range.

Many wireless communication schemes employ a split host-controller architecture, in which a host processor (typically an Applications Processor ("AP")) performs the more sophisticated, power-intensive tasks while a radio controller handles the physical communication and the low-level tasks related to the radio link. It is possible that the AP and the radio controller are integrated into the same hardware package, but even then there may be a logical separation between the two.

This split architecture can be exploited to minimize power consumption. To do so, a system designer tries to push as many tasks as possible down to the radio controller. There are limits on how much this can be done, however. In some cases, the limitations are a consequence of the capability of the radio controller. Radio controllers tend to have less processing power than host processors and are therefore less able to perform certain calculations, such as those involving floating point numbers. Furthermore, radio controllers generally operate at a lower layer in the Open System Interconnection ("OSI") sense and are thus prevented from performing certain tasks.

DRAWINGS

While the appended claims set forth the features of the present techniques with particularity, these techniques may be best understood from the following detailed description taken in conjunction with the accompanying drawings of which:

FIG. 2 illustrates a process in which a host processor builds a data structure that maps transmit power to power steps according to an embodiment.

DESCRIPTION

Figure 1A:
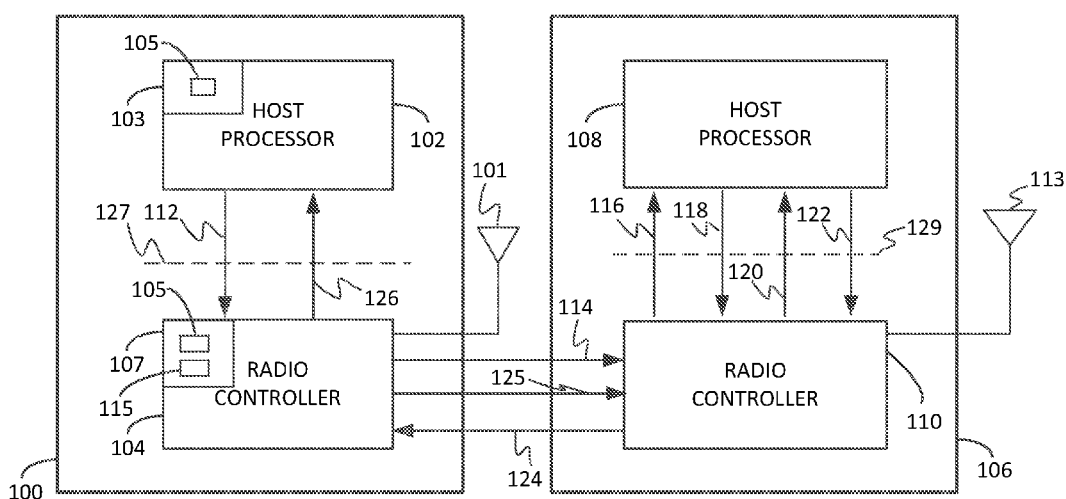
FIG. 1A illustrates wireless devices according to an embodiment.

The present disclosure sets forth a method for estimating the transmit power in which a first device issues a series of power control commands and transmit power requests to a second device, receives transmit power data in response to the transmit power requests, and creates a data structure (e.g., a table) that maps the power steps (e.g., number of steps increased or decreased) of the power control commands with the reported transmit powers. In one embodiment, the first and second devices carry out this process during their initial connection.

In one embodiment, the host processor of the first device builds the data structure. After completing the data structure, the host processor provides the data structure to the radio controller. From that point on, the radio controller can keep track of the transmit power of the second device without the need to wake up the host processor unless a trigger condition occurs (e.g., the path loss between the devices reaches a predetermined threshold). Furthermore, once the host processor of the first device has mapped the power steps to the reported transmit powers, the first device need not wake the second device up for repeated requests for transmit power.

In an alternate embodiment, a low power controller (i.e., not the radio controller) of the first device monitors the power step commands issued by the radio controller of the first device, performs the task of keeping track of the transmit power of the second device, and wakes up the host processor upon certain trigger conditions.

Turning to the drawings, wherein like reference numerals refer to like elements, the following description is based on embodiments of the claims and should not be taken as limiting the claims with regard to alternative embodiments that are not explicitly described herein.

FIG. 1A illustrates a pair of wireless communication devices. To aid in the clarity of the description, each device will be referred to by the role that it plays while carrying out the methods set forth in this disclosure. The pair of devices includes a monitoring device 100 and a reporting device 106. In practice, either device could act as a monitoring device or as a reporting device. In fact, each device may act as reporting device and as a monitoring device at the same time.

Referring still to FIG. 1A, the monitoring device 100 includes a host processor 102, a radio controller 104 communicatively linked to the host processor 102, and an antenna 101 electrically coupled to the radio controller 104. In one embodiment, the monitoring device 100 is a wireless accessory, the host processor 102 is an application processor running a Bluetooth® host stack, and the radio controller 104 includes a Bluetooth® radio and Bluetooth® controller. In this embodiment, the Bluetooth® controller runs a Bluetooth® controller stack. The radio controller 104 may also be implemented using other types of controllers and radios such as an 802.11 controller and radio. The monitoring device 100 can be any wireless device, including a wireless headset, a wireless wristwatch, or a smartphone.

The host processor 102 includes a memory 103 in which a data structure 105 is stored. The function and purpose of the data structure 105 will be described below in further detail. The radio controller 104 also includes a memory 107 in which a copy of the data structure 105 is stored. As with the data structure 105 of the host processor memory 103, the function and purpose of the data structure 105 of the radio controller memory 107 will be described below in further detail. The memory 107 also stores a data structure 115 in which a set of trigger points is stored. The purpose of these trigger points will be described in further detail below.

The host processor 102 and the radio controller 104 communicate with one another via an interface 127. In a Bluetooth® implementation, the interface 127 is a Host-Controller Interface ("HCI").

Referring again to FIG. 1A, the reporting device 106 includes a host processor 108, a radio controller 110 communicatively linked to the host processor 108, and an antenna 113 electrically coupled to the radio controller 110. In one embodiment, the reporting device 106 is a smartphone, the host processor 108 is an application processor running a Bluetooth® host stack, and the radio controller 110 includes a Bluetooth® radio and Bluetooth® controller that runs a Bluetooth® controller stack. The radio controller 110 may also be implemented using other types of controllers and radios such as an 802.11 controller and radio. The reporting device 106 can be any wireless device, however, including a wireless accessory such as a headset or wireless wristwatch.

The host processor 108 and the radio controller 110 of the reporting device 106 communicate with one another via an interface 129. In a Bluetooth® implementation, the interface 129 is a Host-Controller Interface ("HCI").

Figure 1B:
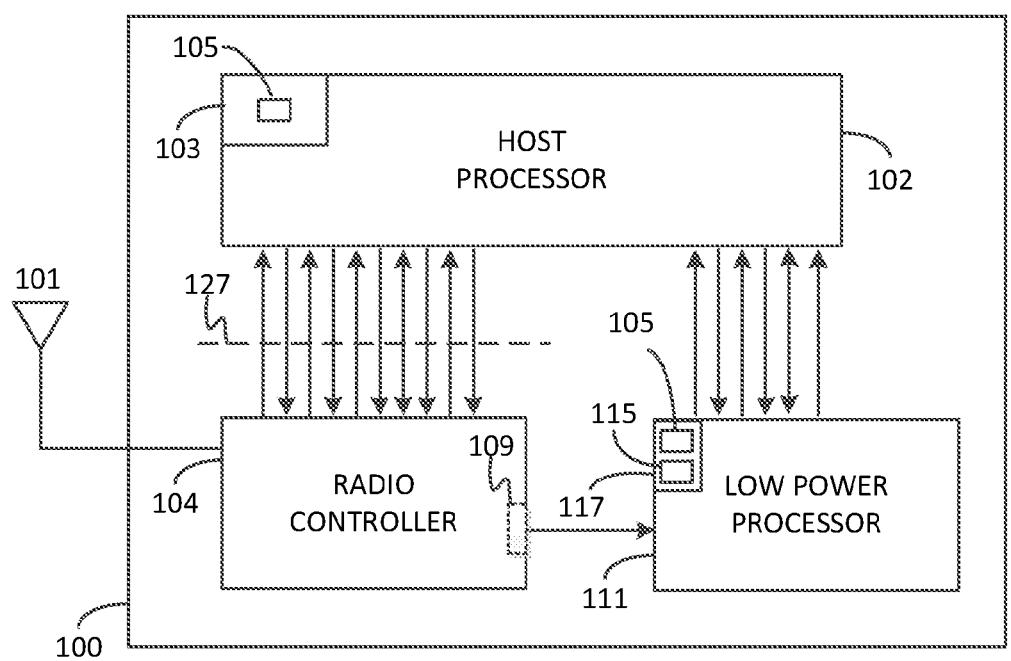
FIG. 1B illustrates a wireless device according to another embodiment.

FIG. 1B shows an alternate implementation of the monitoring device 100. In this implementation, the monitoring device 100 further includes a low-power processor 111. The low-power processor 111 is electrically coupled to both the radio controller 104 and the host processor 102. The low-power processor 111 includes a memory 117 that contains a copy of the data structure 105 and the data structure 115. In one implementation, the low-power processor 111 is coupled to a debug port 109 of the radio controller 104. The low-power processor 111 consumes less power during normal operation than the radio controller 104.

During operation, the monitoring device 100 and the reporting device 106 communicate in at least two different ways—host-to-host and radio-to-radio. The monitoring device 100 obtains the reporting device 106's transmit power through host-to-host communication. When implemented in Bluetooth®, the monitoring device 100 uses the Tx Power Service to obtain this information.

In one embodiment, to order the reporting device 106 to increase or decrease its transmit power, the monitoring device 100 does not need to carry out host-to-host communication with the reporting device 106. Rather, the monitoring device can rely on radio-to-radio communication. When implemented in Bluetooth®, the radio controller 104 of the monitoring device 100 can issue power control commands directly to the radio controller 110 of the reporting device 106—e.g., LMP_incr_power_req, LMP_decr_power_req, LMP_max_power, and LMP_min_power.

FIG. 1A shows an example of how the monitoring device 100 uses host-to-host communication to obtain the reporting device 106's transmit power. The host processor 102 of the monitoring device 100 forms the request, encapsulates the request, and provides the encapsulated request to the radio controller 104 (arrow 112). The radio controller 104 wirelessly transmits the encapsulated request to the radio controller 110 of the reporting device 106 (arrow 114). The radio controller 110 provides the encapsulated request to the host processor 108 (arrow 116).

In response to the request, the host processor 108 requests the transmit power from the radio controller 110 (arrow 118). The radio controller 110 responds to the request by providing its transmit power to the host processor 108 (arrow 120). In response, the host processor 108 forms a transmit power report, encapsulates it, and provides the report to the radio controller 110 (arrow 122). The radio controller 110 wirelessly transmits the report to the radio controller 104 of the monitoring device 100 (arrow 124). The radio controller 104 provides the encapsulated report to the host processor 102 (arrow 126).

FIG. 1A shows an example of how the monitoring device 100 orders the reporting device 106 to change (increase or decrease) its transmit power or to transmit at its maximum or minimum power according to an embodiment of the disclosure. The radio controller 104 of the monitoring device 100, under control of the host processor 102, transmits a power control command to the radio controller 110 of the reporting device (arrow 125). The power control command includes data indicating the number of steps the reporting device 106 should increase or decrease its transmit power. Alternatively, the power control command indicates that the reporting device 106 should transmit at its maximum power, or indicates that the reporting device 106 should transmit at its minimum power. The radio controller 110 responds to the power control command by increasing or decreasing its transmit power, or by transmitting at its maximum or minimum power (depending on which command is used).

Each power step may not be the same size. For example, the size of the decrease from power step 1 to power step 2 may be smaller than that of power step 2 to power step 3. In Bluetooth®, a power step can be between 2 dB and 8 dB.

Referring again to FIG. 1A, the back-and-forth communication (arrows 116, 118, 120, and 122) between the reporting device 106's host processor 108 and radio controller 110 consumes power and is computationally expensive. Therefore, instead of having to constantly request the reporting device's transmit power (for the purpose of determining path loss, for example), the monitoring device 100 issues a series of power control commands to order the reporting device 106 to step through its transmit power range and to report its transmit power at each step. The monitoring device 100 then builds a data structure 105 (e.g., a table) that maps (1) the power step of the power step command to (2) the transmit power reported by the reporting device 106. The monitoring device 100 may also measure the power of signals (e.g., the Received Signal Strength Indicator ("RSSI")) it receives from the reporting device 106 at each step and include that data in the data structure 105.

In one embodiment, the monitoring device 100 builds the data structure 105 when it initially establishes a connection with the reporting device 106—e.g., when the monitoring device 100 powers up or initiates a wireless connection between it and the reporting device. Once the monitoring device 100 has completed the data structure 105, it can subsequently estimate the reporting device 106's transmit power (and consequently the path loss and the distance between the devices) from the power step of the power step command.

In another embodiment, once it creates the data structure 105, the monitoring device 100 stores the data structure 105 in the memory 103 with a device identifier for the reporting device 106. Subsequently, when 100 and 106 next connect, the monitoring device 100 can pull back the stored data structure (which is associated with the reporting device 106) from the memory 103.

In still another embodiment, the monitoring device 100 can discard the data structure 105 after a predetermined period of time and rebuild it to ensure that the data contained within the data structure 105 is current.

According to an embodiment of the disclosure, the host processor 102 builds the data structure 105 and provides a copy of it to the radio controller 104. Table 1 shows an example of how the data structure 105 may be implemented.

TABLE 1

| Power Control Message | Power Step | Reported TX Power Message | Message from Radio Controller of Reporting Device |
|---|---|---|---|
| Go to Max Power | 0 | 10 dBm | At Max Power |
| Decrement Power | 1 | 5 dBm | changed one step |
| Decrement Power | 2 | 0 dBm | changed one step |
| Decrement Power | 3 | −5 dBm | At Min power |

The radio controller 104 keeps track of which row of the table is applicable at any given time.

The host processor 102 also gives the radio controller 104 (or the low power processor 111) a set of trigger conditions, which the radio controller 104 or low power processor 111 stores in the data structure 115. Table 2 shows an example of a set of trigger conditions:

TABLE 2

| Path loss trigger | Condition | Action taken by the radio controller (or the low power processor) | Action Taken by Host Processor | Approximate Distance between the devices |
|---|---|---|---|---|
| 0 dB-40 dB | Near | None | None | 3 m |
| 40 dB-70 dB | Going Out | Wake up host with alert level 1 | Alert | 10 m |
| 70+ dB | Going Fast | Wake up host with alert level 2 | High Alert | 30 m |
| Link time out | Out | Wake up host with alert level 3 | Lock | Out of Range |

As the radio controller 104 issues power step commands to the radio controller 110 of the reporting device 106, the radio controller 104 keeps track of the power step at which the reporting device 106 is currently operating. Thus, when the monitoring device 100 needs to determine the transmit power of the reporting device 106, the radio controller 104 references (e.g., performs a look-up) the data structure 105 (e.g., Table 1) using the (known) current power step, and determines the current transmit power. The radio controller 104 may then use the current transmit power to calculate the path loss between the monitoring device 100 and the reporting device 106. In one embodiment, the radio controller 104 measures the current strength of signals it receives from the radio controller 110 of the reporting device 106 (e.g., the RSSI) and subtracts that value from the transmit power.

In the alternative embodiment of FIG. 1B, the host processor 102 provides the data structure 105 and the trigger conditions to the low-power processor 111 via a bus on the host processor 102. The low power processor 111 monitors the power control commands via the debug port 109 of the radio controller 104. The low-power processor 111 stores the trigger conditions in a data structure 115 of its memory 117. Otherwise, the low-power processor 111 determines the transmit power of the reporting device 106, estimates the path loss, and wakes the host processor 102 upon trigger conditions in the same manner described above for radio controller 104.

FIG. 2 illustrates a process in which the monitoring device 100 builds a data structure that associates reported transmit power levels with RSSI levels according to an embodiment. The monitoring device 100 and the reporting device 106 communicate in the manner described above in conjunction with FIG. 1A. This example uses Table 1 as the data structure and values of Table 2 as the trigger points.

At block 202 the radio controller 104 (under the control of the host processor 102) sends a power control command (e.g., LMP_max_power) to the radio controller 110 of the reporting device 106. The power control command indicates that the radio controller 110 should transmit at its maximum power. In response, the radio controller 110 of the reporting device 106 transmits at its maximum power and reports this fact back to the radio controller 104 of the monitoring device 102 with the message "At max power." At block 204, the host processor 102 of the monitoring device 100 sends a request to the host processor 108 of the reporting device 106 to report its transmit power (e.g., using the TX power service). In response, the host processor 108 obtains the transmit power from the radio controller 110 and reports the transmit power back to the host processor 102 of the monitoring device 100 at block 206 (using the process described above in conjunction with the FIG. 1A). In this example, the reported power is 10 dBm. Optionally, at block 208, the radio controller 104 of the monitoring device 100 measures the signal power (e.g., RSSI) of the transmit power report received at block 206 and provides the measured signal power to the host processor 102.

At block 210, the host processor 102 of the monitoring device 100 maps (within the data structure 105) the reported transmit power to the maximum power. In this case, the power step is 0, meaning that the transmit power is at its starting point in the table. In other implementations, power step 0 maps to the minimum transmit power of the reporting device 106. The host processor 102 may also map the transmit power and the power step to the RSSI of signals received from the reporting device 106.

At block 212, the monitoring device 100 begins a second iteration of transmit and received power data mapping by having its radio controller 104 send a power control command to the reporting device 106 indicating that the reporting device 106 should decrement its transmit power by one power step. In response, the radio controller 110 of the reporting device 106 transmits at the decremented power level (e.g., at 5 dB below its maximum transmit power) and indicates this fact to the radio controller 104 of the monitoring device 100 ("Changed one step"). At block 214, the host processor 102 of the monitoring device 106 sends a request to the host processor 108 of the reporting device 106 to report the reporting device's transmit power. The host processor 108 obtains the transmit power as described above and reports the transmit power to the host processor 102 of the monitoring device 100, which the host processor 102 receives at block 216. In this example, the reported transmit power is 5 dBm (second row of Table 1). Optionally, at block 218, the radio controller 104 of the monitoring device 100 measures the signal power of the transmit power report received at block 216 and provides the measured signal power to the host processor 102. At block 220, the host processor 102 maps (within the data structure 105) the reported transmit power with the power step of the power control command. In this case, the power step is 1. The host processor 102 may also map the transmit power and the power step to the RSSI of signals received from the reporting device 106.

The above process continues until the reporting device has reached its minimum transmit power. At that point, the data structure 105 is considered to be complete. In other implementations, the monitoring device 100 builds the data structure 105 by having its radio controller 104 start the radio controller 110 of the reporting device 106 at minimum power and then step through the radio controller 110's power range from low to high. Furthermore, the monitoring device 100 may run the reporting device 106 through the process of FIG. 2 for multiple modulation schemes. For example, the process of FIG. 2 could be repeated once for Binary phase-shift keying ("BPSK") and once for quadrature phase-shift keying ("QPSK").

Once the host processor 102 of the monitoring device 100 has completed the data structure 105, it provides the data structure (e.g., in the form of a table) to the radio controller 104. The radio controller 104 can then use the data structure to determine the current transmit power of the reporting device 106 (e.g., the current transmit power of the radio controller 110). For example, once the table is completed in the manner described above (from maximum power down to minimum power), the radio controller 104 will deem the current transmit power of the reporting device 106 to be −5 dBm (the last row of Table 1). If the radio controller 104 issues a power control command to the radio controller 110—increase power by 2 steps, for example—the radio controller 104 deems the current transmit power to be 5 dBm (the second row of Table 1).

The host processor 102 also provides trigger conditions to the radio controller 104 (or the low power processor 111), which the radio controller 104 (or low power processor 111) stores in the data structure 115. The trigger conditions can be expressed in many ways, including as path loss or calculated distances. The radio controller 104 monitors the trigger conditions and, if a trigger condition is met, carries out an action (e.g., waking up the host processor 102) as shown in Table 2.

In one embodiment, the host processor 102 pre-calculates a path loss value for each of a set of distances. The host processor 102 then provides the path loss value as trigger points to the radio controller 104. For example, the path loss between the monitoring device 100 and the reporting device 106 can be expressed as:

$$\text{Path Loss} = 20 \log_{10}(d) + 20 \log_{10}(f) - 27.6$$

where d is the distance (in meters) between the two devices and f is the frequency (in Megahertz) of the wireless signals. In this embodiment, the host processor 102 calculates the path loss for multiple distances—e.g., 3 m, 10 m, and 30 m—using the equation above. The radio controller 104 populates the data structure 115 with the path loss values. Table 2 shows an example of pre-calculated path loss values and the distances to which they can be mapped. Thus, the radio controller 104 need not calculate distances from the path loss value (such calculation involves logarithms and floating point values, which are more appropriately handled by the host processor 102), but need only calculate path loss, which is merely the transmit power of the reporting device (which the radio controller 104 estimates using the data structure 105) minus the received signal power (e.g., RSSI).

As the radio controller 104 calculates the path loss, it compares that value with the trigger points. If the path loss crosses a trigger point, then the radio controller 104 wakes up the host processor 102 and gives the path loss value to the host processor 102. In response, the host processor 102 carries out a function with respect to the monitoring device 100. Referring to Table 2, for example, the host processor 102 may do nothing, issue an alert (e.g., an audible alert on speaker or the Light Emitting Diode ("LED") blinking), issue a high alert (e.g., blinking, vibrating, generating haptic output, and generating sound from the speaker at maximum volume), or lock the monitoring device 100 (thereby requiring the user to enter a personal identification number to access it). In one embodiment, the alerts are grouped into levels as shown in Table 2.

Figure 3:
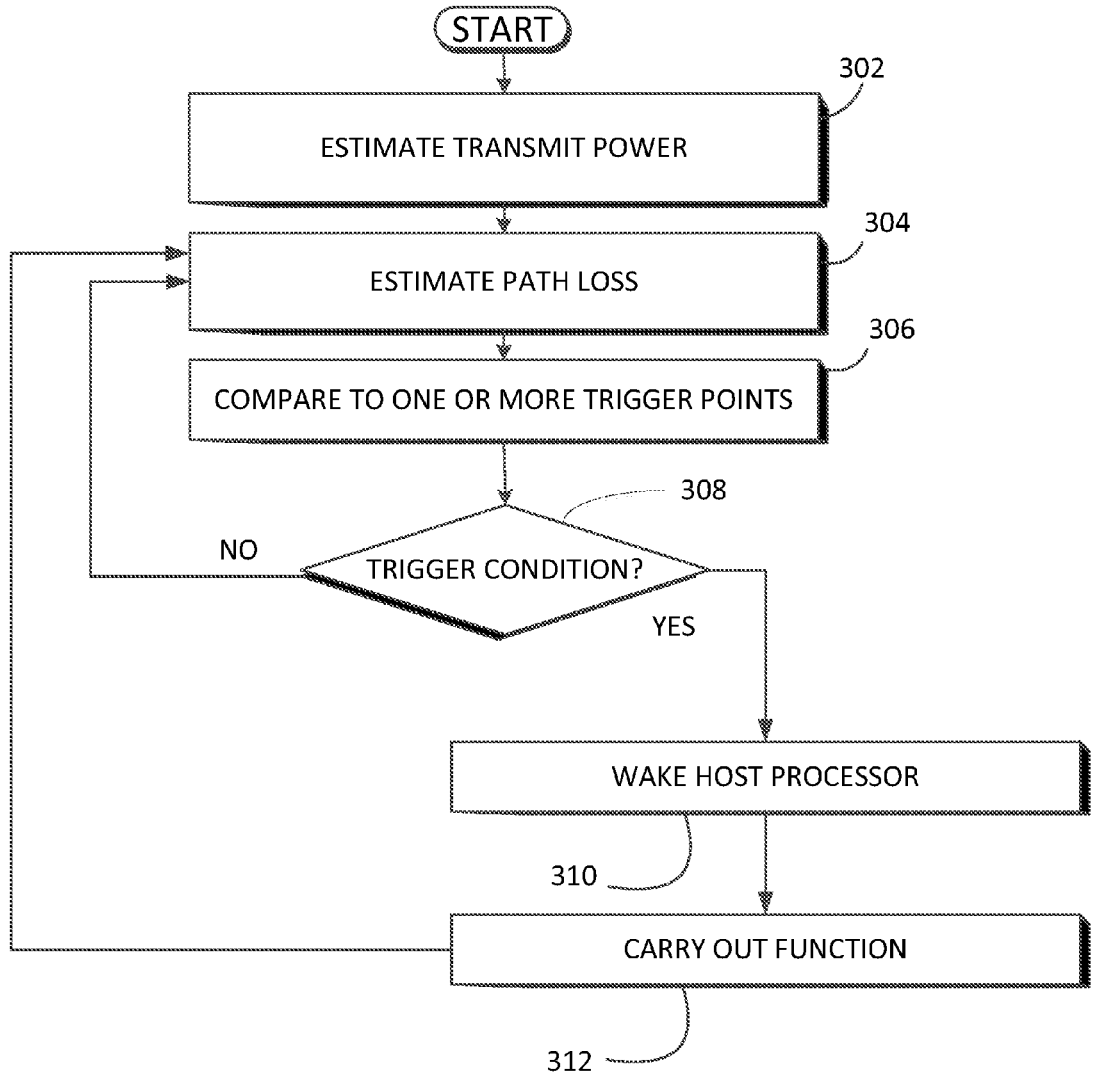
FIG. 3 illustrates a process in which a radio controller compares path loss values with trigger points in an embodiment.

FIG. 3 shows how the radio controller 104 of the monitoring device 100 monitors for and reacts to trigger conditions in an embodiment of the disclosure. At block 302, the radio controller 104 estimates the transmit power of the reporting device 106 using the data structure 105 as previously described, which the radio controller 104 received previously from the host processor 102.

At block 304, the radio controller 104 (or the low-power processor 111) estimates the path loss by measuring the power of signals it receives from the reporting device 106, subtracting the measured power of the received signals from the estimated transmit power. At block 306, the radio controller 104 (or the low-power processor 111) compares the estimated path loss with the trigger values. If, at decision point 308, the estimated path loss reaches a predetermined threshold (e.g. 45 dB, which falls under the second row of Table 2), then the radio controller 104 (or low-power processor 111) wakes the host processor 102 at block 310. The host processor 102 carries out some action (e.g., issuing an alert, as in the second row of Table 2) at block 312.

The radio controller 104 or low-power processor 111 may repeat this process each time the radio controller 104 measures the received signal power—e.g., as the radio controller 104 attempts to keep the received signal power within the golden window during normal operation.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. A method comprising:
    transmitting a first power control command to a device indicating a power level at which the device is to transmit;
    initiating a first request for the device to report its transmit power;
    receiving a first reported transmit power from the device in response to the first request;
    transmitting a second power control command to the device indicating one or more power steps by which the device is to change its transmit power level;
    initiating a second request for the device to report its transmit power;
    receiving a second reported transmit power from the device in response to the second request;
    creating a data structure that maps the indicated power level of the first power control command to the first reported transmit power, and maps the one or more power steps of the second power control command to the second reported transmit power, the data structure including a set of path loss trigger conditions;
measuring a strength of signals received from the device;
determining a path loss from the device based on the measured strength of the signals and an estimated current transmit power level of the device as referenced from the data structure;
determining, by a radio controller, whether the path loss coincides with one or more of the path loss trigger conditions; and
waking a host processor, by the radio controller, if the determined path loss coincides with the one or more path loss trigger conditions.

2. The method of claim 1 wherein the indicated power level is a maximum transmit power of the device.

3. The method of claim 1 wherein the indicated power level is a minimum transmit power of the device.

4. The method of claim 1 further comprising:
measuring a signal power of a first set of signals received from the device;
mapping, within the data structure, the measured signal power of the first set of signals to the indicated power level and the first reported transmit power;
measuring the signal power of a second set of signals received from the device;
mapping, within the data structure, the measured signal power of the second set of signals to the one or more power steps and the second reported transmit power.

5. The method of claim 1 further comprising referencing the data structure to estimate the current transmit power of the device.

6. The method of claim 1 further comprising:
transmitting a third power control command indicating one or more additional power steps by which the device is to change its transmit power level; and
referencing the data structure using the one or more additional power steps to estimate the current transmit power level of the device.

7. The method of claim 6 further comprising:
estimating the path loss from the device based on the measured strength and the estimated current transmit power level.

8. The method of claim 7 further comprising estimating a distance to the device based on the estimated path loss.

9. The method of claim 1 further comprising:
measuring a power of signals received from the device;
determining that the measured power is outside of a predetermined range;
based on the determination, transmitting a third power control command indicating one or more additional power steps by which the device is to change its transmit power;
referencing the data structure to estimate, based on the one or more additional power steps, a current transmit power level of the device.

10. The method of claim 1 wherein:
said transmitting to the device, by the radio controller, the first and second power control commands; and
a host processor said initiating the first and second requests, said creating the data structure, and further comprising providing the data structure to the radio controller.

11. The method of claim 10 further comprising:
referencing the data structure, by the radio controller, to estimate the current transmit power of the device.

12. The method of claim 11 wherein:
said measuring, by the radio controller, the strength of signals received from the device; and
said determining, by the radio controller, the path loss from the device based on the measured strength of the signals and the estimated current transmit power.

13. The method of claim 12 further comprising:
providing, by the host processor, the set of path loss trigger conditions to the radio controller.

14. A device, comprising:
a radio controller configured to:
transmit a power control command to a monitored device, the power control command indicating power steps for the monitored device to transmit at different power levels;
receive reported transmit power at each of the different power levels from the monitored device;
a host processor configured to:
generate a data structure that maps the power steps of the power control command to the reported transmit power for each of the different power levels, the data structure including path loss trigger conditions;
provide the data structure to the radio controller;
the radio controller further configured to:
measure a strength of signals received from the monitored device;
determine a path loss between the device and the monitored device based on the measured strength of the signals and an estimated transmit power level of the monitored device; and
wake the host processor if the determined path loss coincides with one or more of the path loss trigger conditions.

15. The device as recited in claim 14, wherein the different power levels indicated by the power steps of the power control command include a maximum transmit power of the monitored device.

16. The device as recited in claim 14, wherein the different power levels indicated by the power steps of the power control command include a minimum transmit power of the monitored device.

17. The device as recited in claim 14, wherein the radio controller is configured to reference the data structure to estimate the transmit power level of the monitored device.

18. The device as recited in claim 14, wherein the host controller is configured to initiate that the radio controller request the monitored device to report the reported transmit power at each of the different power levels.

19. A system, comprising:
a wireless device configured to transmit at different power levels;
a monitoring device to monitor a transmit power of the wireless device, the monitoring device configured to:
transmit a power control command to the wireless device, the power control command initiating the wireless device to transmit at the different power levels;
receive reported transmit power at each of the different power levels from the wireless device;
generate a data structure that maps the reported transmit power for each of the different power levels, the data structure including path loss trigger conditions;
measure a strength of signals received from the wireless device;

determine a path loss between the monitoring device and the wireless device based on the measured strength of the signals and an estimated transmit power level of the wireless device; and wake a host processor of the monitoring device if the determined path loss coincides with one or more of the path loss trigger conditions.

20. The system as recited in claim 19, wherein:

the host controller is configured to initiate that a radio controller of the monitoring device request the wireless device to report the reported transmit power at each of the different power levels; and the wireless device is configured to communicate the reported transmit power at each of the different power levels to the monitoring device.

* * * * *